(12) United States Patent
Boyle et al.

(10) Patent No.: US 10,930,013 B2
(45) Date of Patent: Feb. 23, 2021

(54) METHOD AND SYSTEM FOR CALIBRATING IMAGING SYSTEM (71) Applicant: Cathx Ocean Limited, Naas (IE)

(72) Inventors: Adrian Boyle, Kildare (IE); Michael Flynn, Kildare (IE)

(73) Assignee: CATHX OCEAN LIMITED, Naas (IE)

( * ) Notice: Subject to any disclaimer, the term of this patent is extended or adjusted under 35 U.S.C. 154(b) by 0 days.

(21) Appl. No.: 16/484,655

(22) PCT Filed: Feb. 9, 2018

(86) PCT No.: PCT/EP2018/053355
§ 371 (c)(1),
(2) Date: Aug. 8, 2019

(87) PCT Pub. No.: WO2018/146280
PCT Pub. Date: Aug. 16, 2018

(65) Prior Publication Data
US 2020/0105019 A1    Apr. 2, 2020

(30) Foreign Application Priority Data

Feb. 9, 2017 (GB) .................................. 1702118.9

(51) Int. Cl.
*G06T 7/80* (2017.01)
*G06T 7/521* (2017.01)
(Continued)

(52) U.S. Cl.
CPC ............... *G06T 7/80* (2017.01); *G01C 11/02* (2013.01); *G06T 7/344* (2017.01); *G06T 7/521* (2017.01);
(Continued)

(58) Field of Classification Search
USPC ....................................................... 348/135
See application file for complete search history.

(56) References Cited

U.S. PATENT DOCUMENTS

| 2005/0270375 | A1* | 12/2005 | Poulin | G06T 7/521 |
| | | | | 348/187 |
| 2015/0279016 | A1* | 10/2015 | Kim | G06T 7/80 |
| | | | | 382/154 |
| 2017/0195589 | A1* | 7/2017 | Kovacovsky | H04N 5/353 |

FOREIGN PATENT DOCUMENTS

WO    2014060564 A1    4/2014

OTHER PUBLICATIONS

International Search Report for PCT/EP2085/053355 dated Apr. 19, 2018.
(Continued)

*Primary Examiner* — Behrooz M Senfi
(74) *Attorney, Agent, or Firm* — Meagher Emanuel Laks Goldberg & Liao, LLP (57) ABSTRACT

Provided are a method and system for calibrating parameters of an imaging system comprising at least one imaging device and broad and structured light sources, the method comprising: the at least one imaging device sequentially capturing broad light source image data and structured light source image data of one or more scenes using the broad and structured light sources, respectively; generating a photogrammetric model of the broad light source image data and a photogrammetric model of the structured light source image data using respective coordinates of the broad and structured light source image data; determining corresponding features in the respective photogrammetric models; iteratively solving parameters of the imaging system to correct variations between corresponding features in the respective photogrammetric models, converge the models and obtain calibration parameters; and applying the calibra-
(Continued)

tion parameters to the imaging system to compensate for errors in the relative positions of the imaging device and structured light source.

14 Claims, 11 Drawing Sheets

(51) Int. Cl.
    *G06T 7/33*     (2017.01)
    *G06T 7/73*     (2017.01)
    *G01C 11/02*     (2006.01)
    *H04N 5/225*     (2006.01)
    *H04N 5/247*     (2006.01)

(52) U.S. Cl.
    CPC ............. *G06T 7/75* (2017.01); *H04N 5/2256* (2013.01); *H04N 5/247* (2013.01); *G06T 2207/10028* (2013.01); *G06T 2207/30244* (2013.01)

(56) References Cited

OTHER PUBLICATIONS

Yoshimura Reiji et al: "Automatic registration of MLS point clouds and SfM meshes of urban area", Geo-spatial Information Science, Jul. 2, 2016 (Jul. 2, 2016), pp. 171-181.
Zhao W et al: "Alignment of continuous video onto 3D point clouds", Proceedings of the 2004 IEEE Computer Society Conference on Computer Vision and Pattern Recognition Jun. 27-Jul. 2, 2004 Washington. DC. USA. IEEE, Proceedings of the 2004 IEEE Computer Society Conference on Computer Vision and Pattern Recognition IEE, vol. 2, Jun. 27, 2004 (Jun. 27, 2004), pp. 964-971.
He, Fangning : "Co-registration between imagery and point cloud acquired by MLS platform", Feb. 1, 2012 (Feb. 1, 2012), pp. 1-44.
Craciun, Daniela et al: "Image-Laser Fusion for In Situ 3D Modeling of Complex Environments: A 4D Panoramic-Driven Approach", Mar. 7, 2012 (Mar. 7, 2012), pp. 3-28.
Bleier, M. et al.: "Low-Cost 3D Laser Scanning in Air Orwater Using Self-Calibrating Structured Light", ISPRS—International Archives of the Photogrammetry, Remote Sensing and Spatial Information Sciences, Jan. 20, 2017 (Jan. 20, 2017). pages 105-112.
Yu, Lingli et al: "Separated Calibration of a Camera and a Laser Rangefinder for Robotic Heterogeneous Sensors", International Journal of Advanced Robotic Systems, vol. 10, No. 10, Jan. 1, 2013 (Jan. 1, 2013), p. 367.

* cited by examiner

METHOD AND SYSTEM FOR CALIBRATING IMAGING SYSTEM

FIELD

The present invention is related to calibration of imaging systems, and specifically to the calibration of component parts of an imaging system comprising at least one imaging device and broad and structured light sources.

BACKGROUND OF THE INVENTION

Surveying and inspection is a significant component of many industries, such as marine and oceanographic sciences and industries. For example in underwater surveying, considerable costs are incurred in surveying and inspection of artificial structures such as ship hulls; oil and cable pipelines; and oil rigs including associated submerged platforms and risers. There is great demand to improve the efficiency and effectiveness and reduce the costs of these surveys. The growing development of deep sea oil drilling platforms and the necessity to inspect and maintain them is likely to push the demand for inspection services even further. Optical inspection, either by human observation or human analysis of video or photographic data, is required in order to provide the necessary resolution to determine their health and status.

Underwater 3D Laser imaging systems using laser triangulation requires accurate calibration of the relative positions of the laser and camera systems in order to compute the XYZ position of the laser points.

Specifically, pre-calibration of component positions has limited capability to deliver precision, accuracy and repeatability in real world measurement applications due to a number of factors that cause deviation from the ideal or pre-calibrated positions.

Specific factors that cause a system calibrated in air or water to deviate include the following:

Mechanical movement of one or more elements causes substantial deviations to the calibration parameters. In a subsea environment, this mechanical motion can be due to torsion, thermal expansion, contraction or the influence of pressure on housings, internal optical element movements. In addition to this, salinity, thermoclines and local deviations in water refractive indices can all have a substantial impact on the final accuracy and repeatability of measurement.

Over water, reduced air pressure, cooler air and atmospheric effects due to heat and air density have a substantial impact on the accuracy.

In view of the above, there is a need to provide a method and system for calibrating imaging systems.

SUMMARY

According to the present disclosure there is provided a method and system and advantageous features as detailed in the claims.

The present disclosure addresses the problems associated with deviations in the componentry of imaging systems. To resolve this problem, image data may be processed after collection to remove these effects. Potentially the data may be processed near real time to provide on the fly measurement, or after collection and storage at a later time, the data may be processed to establish calibration parameters that account for these deviations.

The techniques described herein allow these calculations to be performed using sequential and dual mode laser and optical imaging systems.

BRIEF DESCRIPTION OF THE DRAWINGS

The present application will now be described with reference to the accompanying drawings in which.

DETAILED DESCRIPTION OF THE DRAWINGS

The present disclosure provides a method and system for compensating for deviations in imaging systems.

Specifically, a method and system is provided for obtaining calibration parameters for a sequential imaging system comprising at least an imaging device and broad and structured light sources.

There is provided a below a brief discussion on some of the terminology that will be used in this description.

Machine Processing:

General processing of images and point cloud data sets. The term is an umbrella term covering, but not limited to, image processing, computer vision, machine vision and machine learning.

Image Processing:

Extracting information on images, distribution of light, colour, sharpness, etc. in a way to determine the quality of the image and to identify changes compared to other images.

Computer Vision:

Starts with detection of objects, edges or features in an image or group of images. It is a direct action using image processing data also but particularly finding transitions of colour, sharpness or intensity for example, in images to find events or to classify objects. (Blob detectors, edge detectors, etc.)

Machine Vision:

Taken to its final objective, machine vision takes information from image processing and computer vision processing and uses it to adapt the acquisition of images to alter the measured values. That is, the machine is in control of the actual acquisition so that if something changes it can adapt.

Machine Learning:

is a step further in that objects are classified based on analysis of many similar objects.

There is some lack of clarity in general between machine vision and machine learning. For the purposes of the present application, machine learning is included in the definition of machine processing.

2D Machine Processing:

Refers to general processing of 2D information as described above.

3D Machine Processing:

Refers to general processing of 3D information in much the same way as (2D) above.

3D laser point clouds may be generated from multiple laser acquisitions. Each acquisition forms a 2D slice that describes the shape of the object imaged by the laser. For analysis of each of these slices the slice can be reduced to a group of statistics, i.e., min, max, mean, standard deviation, etc. and do large scale statistical analysis across an entire 3D data set. Alternatively shape/geometric analysis can be performed on each full slice to identify objects such as pipes.

3D Machine Vision:

Using 3D models/point clouds to recognise objects and extract measurement information, for example edge to edge distances automatically extracted from a structure. Fitting a circle to a pipeline, finding height of an object beside a pipe, etc.

The present disclosure provides a method for calibrating parameters of an imaging system comprising at least one imaging device and broad and structured light sources, the method comprising: the at least one imaging device sequentially capturing broad light source image data and structured light source image data of one or more scenes using the broad and structured light sources, respectively; generating a photogrammetric model of the broad light source image data and a photogrammetric model of the structured light source image data using respective coordinates of the broad and structured light source image data; determining corresponding features in the respective photogrammetric models; iteratively solving parameters of the imaging system to correct variations between corresponding features in the respective photogrammetric models, converge the models and obtain calibration parameters; and applying the calibration parameters to the imaging system to compensate for errors in the relative positions of the imaging device and structured light source.

Coordinates and specifically coordinates of the broad and structured light source image data, refer to the relative position (compared to other images) or absolute position (on Earth) of the image data, (e.g. Cartesian coordinates or polar coordinates that show positions).

Figure 1:
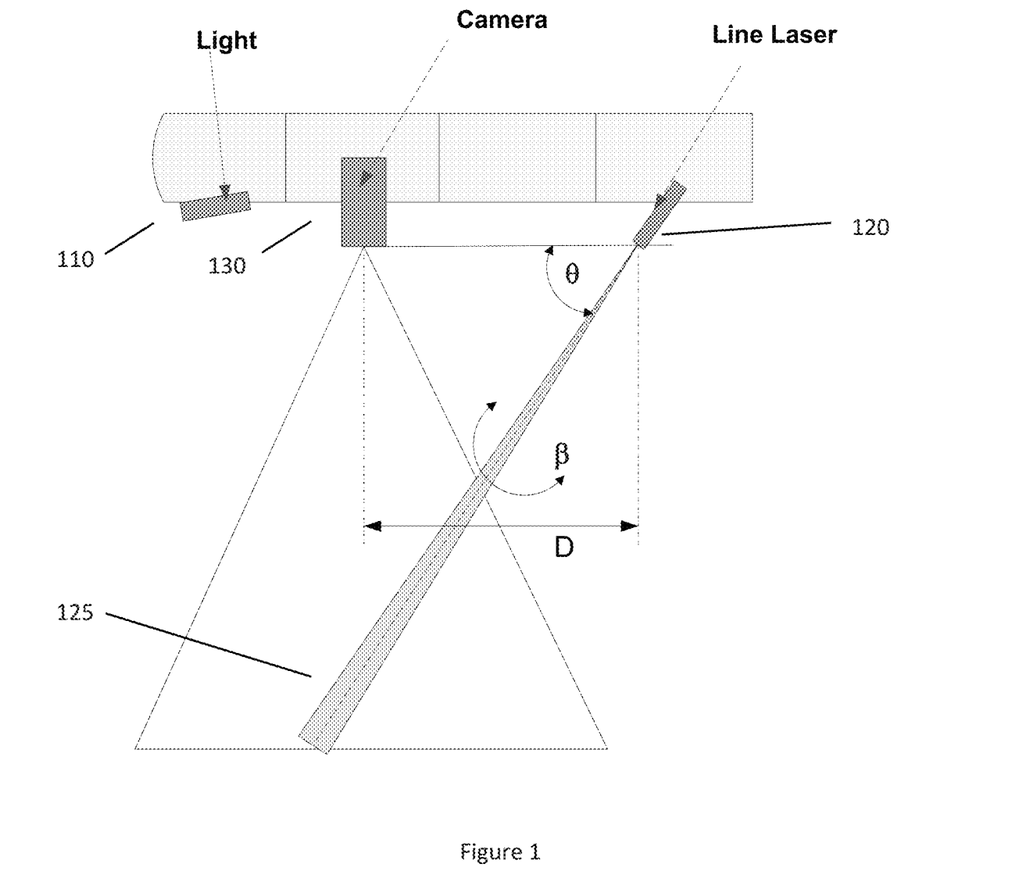
FIG. 1 illustrates a typical layout of a sequential imaging system.

FIG. 1 illustrates a typical layout of a sequential imaging system 100. Referring to FIG. 1, the system 100 includes a broad light source 110, a structured light source 120 and an imaging device 130 such as a camera. The broad light source 110 may comprise a white light source. The structured light source 120 may comprise a laser source. The term 'structured light source' may be understood to refer to a light source producing a beam having a defined shape, structure, arrangement, or configuration. It does not include light that provides generally broad or wide illumination, such as a white light source. Similarly, a 'structured light source' may be understood to refer to a light source adapted to generate such a beam. Typically, a structured light beam is derived from a laser, but may be derived in other ways. For ease of explanation, a laser source will be described as a structured light source throughout the present disclosure.

The imaging device 130 may be configured to shoot laser and white light images in a defined sequence. The broad light source 120 may be configured to project a fan of light 125 at an angle to the imaging device 130. This fan of light 125 typically fills the horizontal field of view of the imaging device 130 and any objects that the fan of light 125 intersects are imaged by the imaging device 130 and their shape can be determined.

Figure 2:
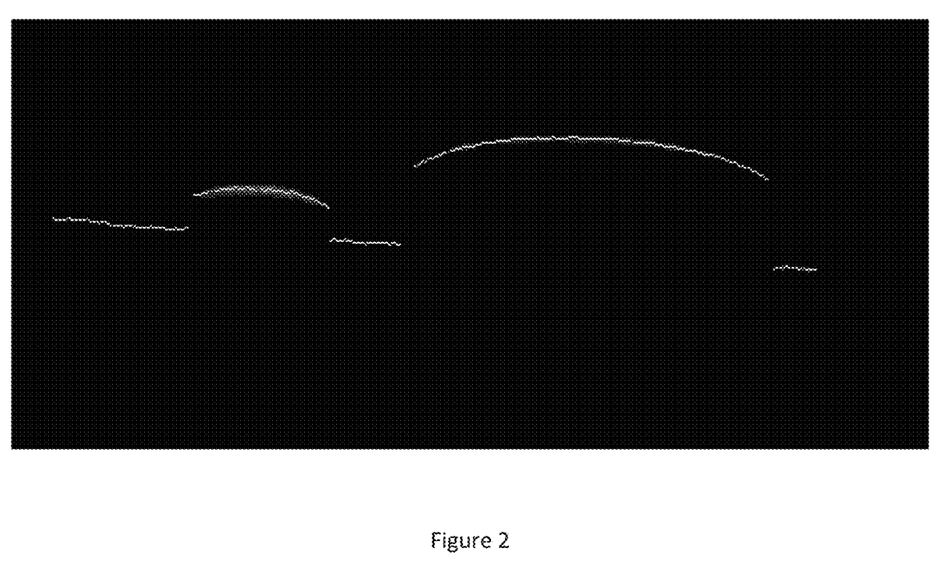
FIG. 2 shows a typical laser line image.

Because of the sequential nature of the imaging, the broad light source 120 is off when the laser is being captured. FIG. 2 shows a typical laser line image. Referring to FIG. 2, the laser line image is obtained from a laser hitting two pipes sitting on a seabed. The image in FIG. 2 is one laser swath capture. A laser imaging system typically captures 30 to 60 of such images per second. Such laser images may be processed into 3 dimensional lines which are referenced only to the camera. Thus, the 3D data needs to be positioned in real world space by navigation data which tracks the travel path of the camera as the laser data is being acquired.

With reference to FIG. 2, all extracted points from the image can be computed to an X, Y & Z coordinate relative to the camera.

As mentioned above, laser triangulation may be used to compute the XYZ position of the laser points. Laser triangulation requires accurate calibration of the relative positions of the laser and camera systems in order to compute the XYZ position of the laser points. Because the camera image vector and the laser plane are triangulated, it is important to accurately determine the relative positions of the laser and camera systems.

The laser may be positioned according to the system design and its position is known to >95% accuracy. This is determined from either the design layout or some rudimentary measurements and in some cases the accuracy may be much higher. The laser position has three parameters, as illustrated in FIG. 1.

'D' is the distance from the optical axis of the imaging device to the laser plane. This measurement is taken at the plane of the camera entrance flat port, 'θ' is the angle of the laser plane to the imaging device flat port plane, and 'β' is the twist in the laser plane. On a conventional system this as close to zero degrees as practically possible In camera space, the laser plane can be expressed in the form:

$$ax+by+cz+d=0$$

The laser plane equation above is derived from the relative angles and offset ('D', 'θ', 'β') of the laser to the camera and uses the camera optical centre as its (0,0,0) position.

The camera laser separation may also be defined as a transform matrix describing the offsets and rotations.

Each point on the camera sensor may be represented by a 3D space vector $$\frac{X}{x'} = \frac{Y}{y'} = \frac{Z}{f}$$

X, Y, and Z being the coordinates relative to the camera, where f is the focal length of the camera.

The point in space (X, Y, Z) is the intersection of the 3D space vector and laser plane.

Calibration of the laser camera separation involves solving for ('D', 'θ', 'β')

3D Photogrammetric Calibration Process Using 3D Machine Vision

A key aspect as to how the calibration process is achieved is that both laser data and high resolution white light images are captured. Such image data capture sequence is typically imaged on a single camera on a very accurate time base.

Accordingly, two data sets comprising laser 3D images and white light images may be obtained. A photogrammetric model for the white light images may be generated. Thus, two parallel streams of 3D data can be effectively obtained. Both data sets are not entirely independent of each other when processed. On most vehicles individual laser swaths may be positioned using inertial-based navigation data. However, according to an embodiment of the present disclosure, for higher positional accuracy the photogram metric pose of the camera obtained from the white light images may be used to refine this to a much higher local accuracy. It will be understood that the combination of position and orientation is referred to as the pose of an object. The camera pose however has no scale initially. To scale the pose data, the laser data may be used to range and scale the pose data. Thus, in effect both the laser 3D images and the white light images are helping each other produce two 3D data sets. Both data sets are on a common local 3D Cartesian coordinate system.

By running over an interesting scene with many distinct features, 3D machine vision techniques may be used to locate common 3D features in each data set. By tracking the difference in feature position between each data set, the calculation of the laser plane equation described above may be iterated to converge the two data sets.

Figure 3:
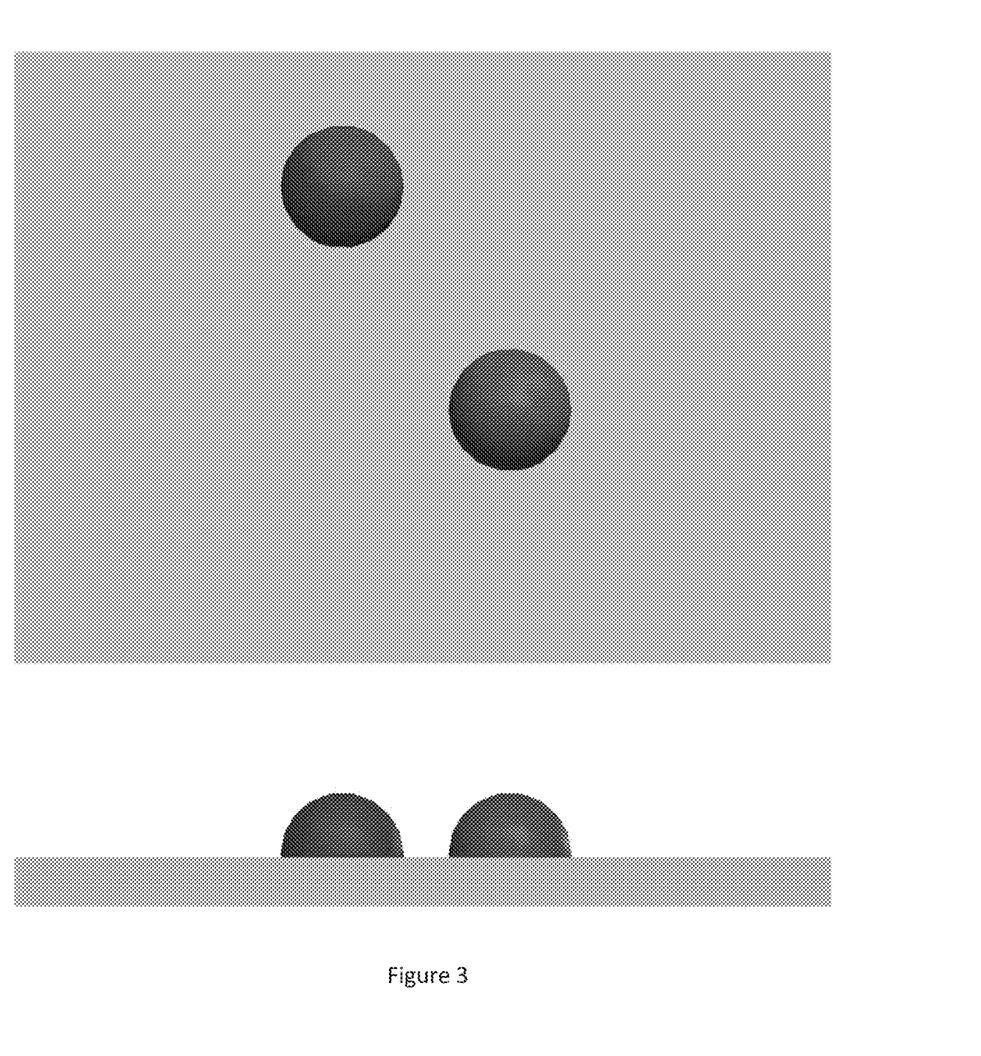
FIG. 3 is a simple scene with some 3D relief.
Figure 4:
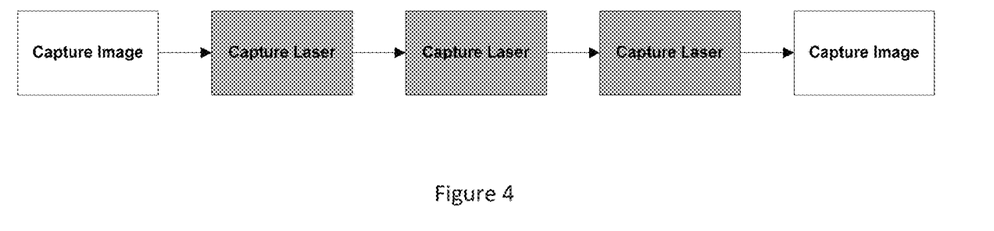
FIG. 4 shows a sample sequence of white light images and 3D laser images in an imaging system for capturing the scene of FIG. 3.
Figure 5:
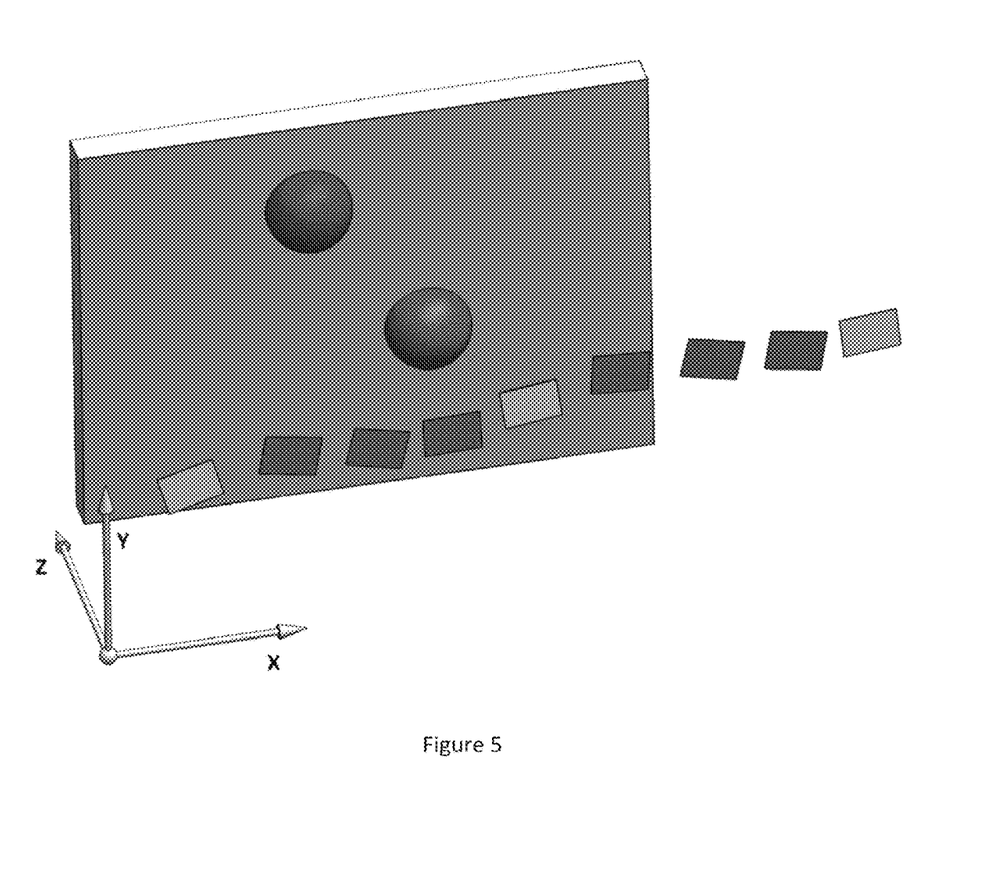
FIG. 5 is a 3D view showing the image capture of the scene of FIG. 3 in a 3D view with a XYZ Cartesian system.

To represent this visually, consider a simple scene with some 3D relief, as illustrated in FIG. 3. The scene illustrated in FIG. 3 may be imaged in a simple sequence with a combination of white light images and 3D laser images, as illustrated in FIG. 4 which shows a sample capture sequence of the above-described image types. FIG. 5 is a 3D view showing the image capture in a 3D view with a XYZ Cartesian system.

Figure 6:
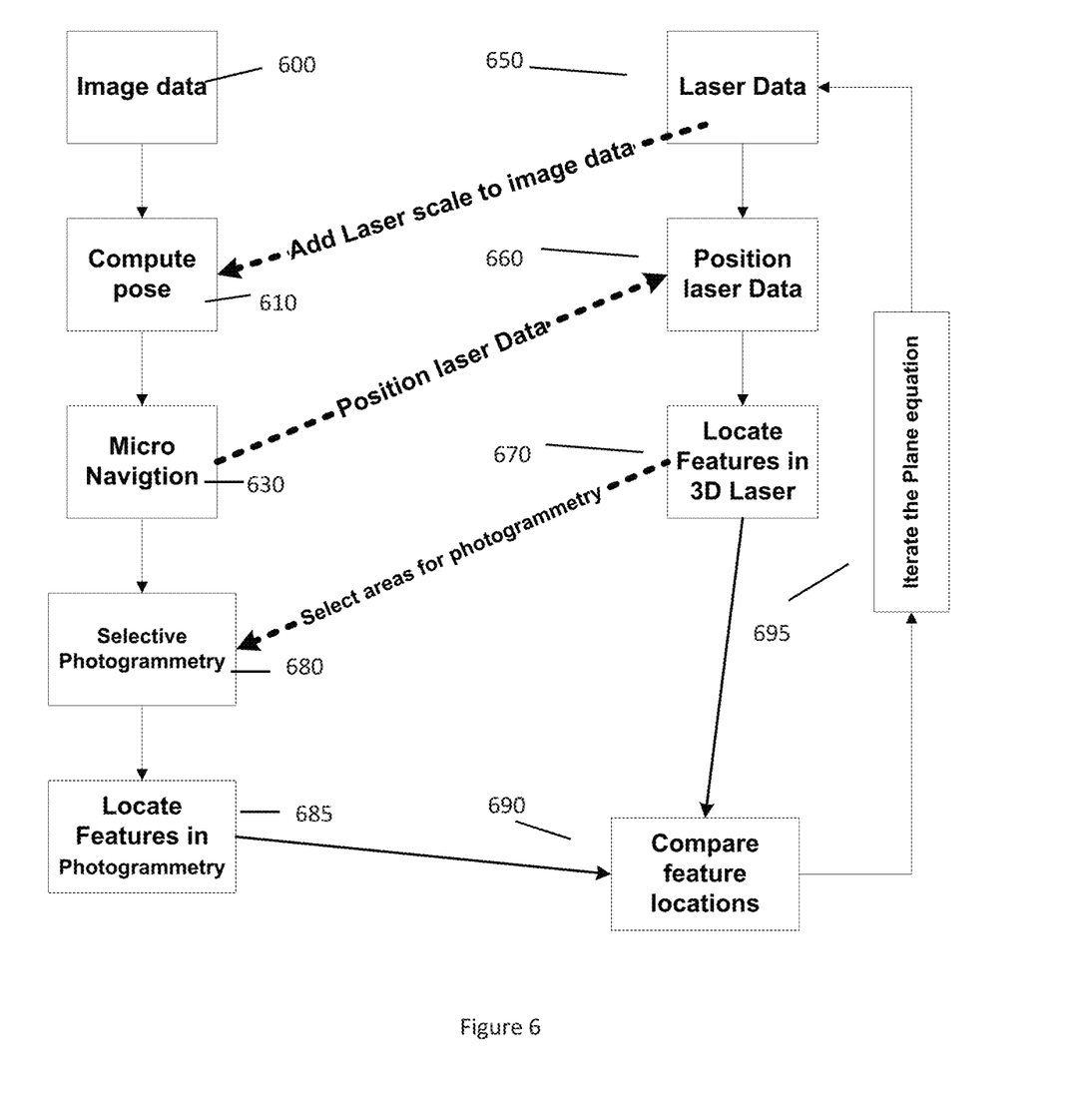
FIG. 6 illustrates a process of obtaining calibration parameters using photogrammetric calibration, according to an embodiment of the present disclosure.

With the sequence of images captured as described above, the image data can be processed as follows and as illustrated in FIG. 6, according to an embodiment of the present disclosure. FIG. 6 illustrates a process of obtaining calibration parameters using photogrammetric calibration, according to an embodiment of the present disclosure. Referring to FIG. 6, the image data comprises two sets of data, white light image data 600 and laser data 650. The white light image data 600 may be processed to compute raw camera pose 610, i.e., pose without scale. The raw camera pose 610 may be obtained by using feature detection algorithms to find alignment features common to an overlapping succession of images. The laser data 650 may be applied to scale the pose 610 to real world relative camera positions. In this manner, the system micro navigation 630 can be computed. For clarity, micro-navigation refers to the ability to measure the tracking movement of a camera, and therefore of a vehicle on which the camera is installed, precisely to millimetre resolution or higher in all axes. Referring to FIG. 6, the camera pose obtained from the white light image data may be used to determine the position of the laser data 660.

The camera positions are then interpolated. Because the time interval between still images is typically several hundred milliseconds the system movement is straightforward to compute. For instance, in water a relatively heavy vehicle with significant inertia may remain on a confined path. This data may be supplemented with an inertial measurement unit (IMU).

Once the laser and camera positions are known, this data may then be used to position laser 3D profiles to generate a 3D model or map.

A sparse model may be generated based on several thousand common features found in each image. This is a very light form of photogrammetry in that the model is sparse and can be performed quickly. An aim of the present disclosure is to enable model generation in real time.

To determine the correct calibration parameters, obvious features in each model may be matched using 3D machine vision. Variation in position and size of the same feature from laser model to pose model is caused by errors in the calibration numbers. Iteratively solving the laser position parameters ('D', 'θ', 'β') 695 makes the two 3D data sets converge. By roughly measuring the values prior to the iteration, upper and lower limits on each value can be set. This speeds up the iteration process. For example, getting 'D' to ±1 cm of its nominal value and 'θ' & 'β' to ±2° is easily achievable with simple tools. If the system is mounted on a designed bracket system these values may well be retrievable from a CAD model.

Using a significant data set and comparing lots of 'feature pairs' 690 may significantly increase the accuracy of the calibration method.

Finding features in 3D laser data is an efficient processing step 670. This can be used to drive selective photogrammetry 680 of the located feature areas in the pose model. Photogrammetry is not an efficient process so selection of interesting regions 680 on which to perform photogrammetry 685 may greatly speed up the overall process.

2D Machine Vision-Based Calibration

Figure 7:
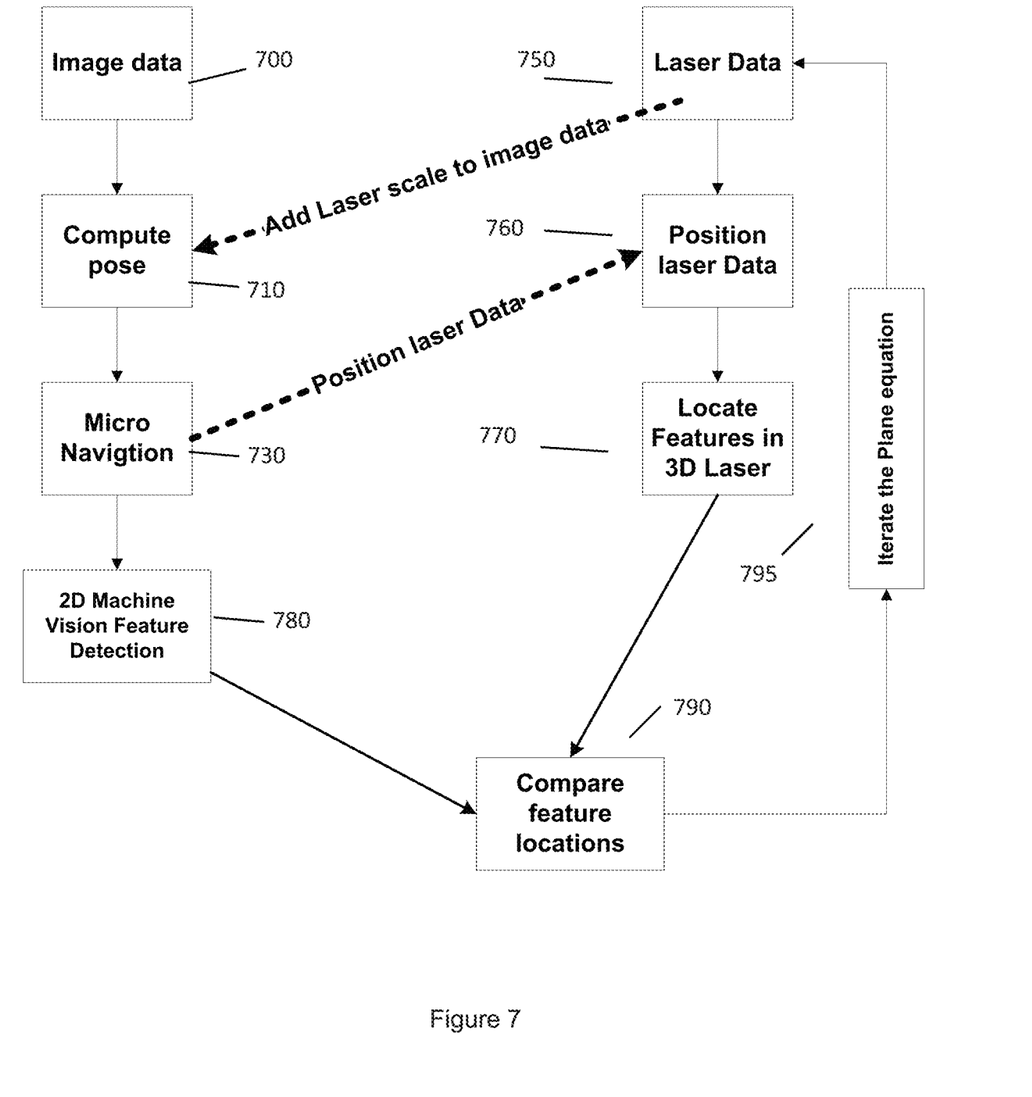
FIG. 7 illustrates a process of obtaining calibration parameters using 2D machine vision based calibration, according to an embodiment of the present disclosure.
Figure 8:
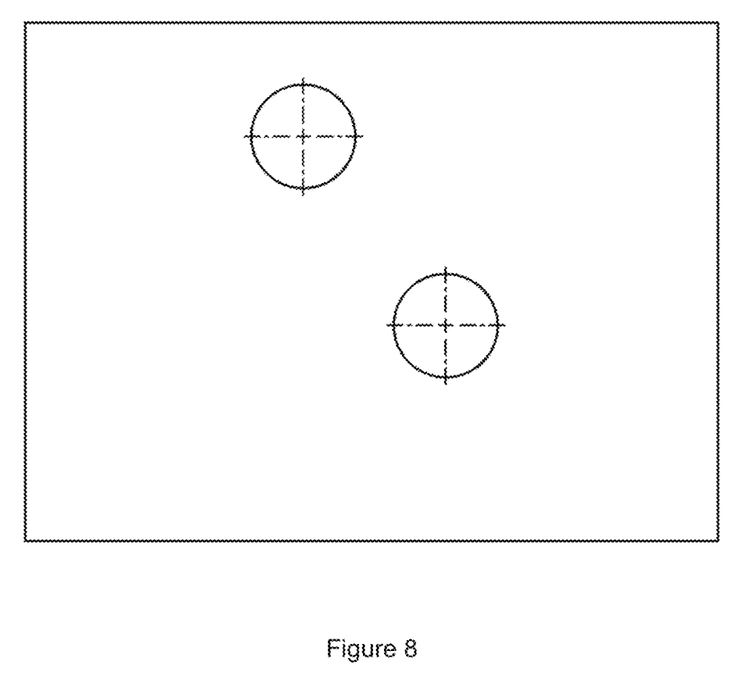
FIG. 8 illustrates an example of image-based 2D machine vision feature detection.

A slightly alternative and potentially simpler method involves identifying a feature in the 2D images and comparing this 790 to where the feature should be located in the laser 3D model. FIG. 7 illustrates a process of obtaining calibration parameters using 2D machine vision based calibration, according to an embodiment of the present disclosure. Reference numerals 700, 710, 730, 750, 760, 770, 790 and 795 in FIG. 7 refer to the corresponding features labelled respectively as 600, 610, 630, 650, 660, 670, 690 and 695 in FIG. 6. As the images and camera locations (pose) are in the same Cartesian space as the laser 3D data, errors due to incorrect calibration will also show up here when that same vector is traced in the laser 3D data. The centroid of a laser 3D feature can be positioned in the image by calculating its vector to the camera position and using the camera calibration model to trace this vector to a pixel location. The centroid of the feature in the image can then be compared to its apparent position in the laser 3D reprojection. In this regard, FIG. 8 illustrates an example of image-based 2D machine vision feature detection. Taking the previous photogrammatic example and running 2D machine vision 780 on the scene locates the features as shown in FIG. 8.

Figure 9:
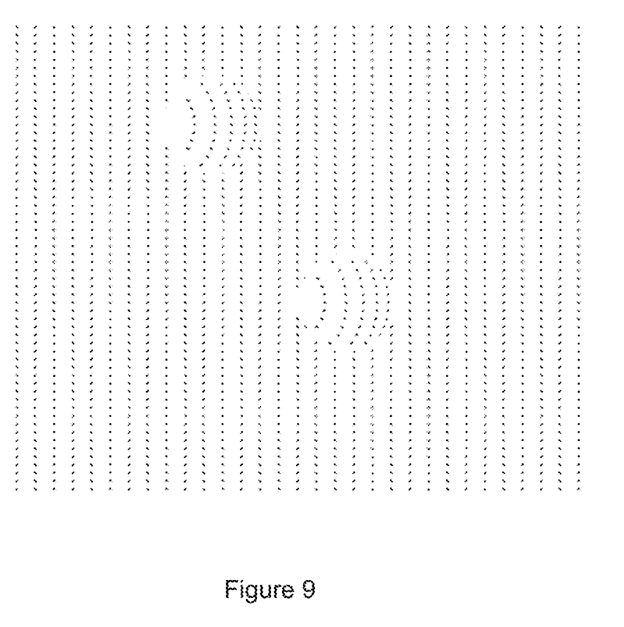
FIGS. 9 and 10 illustrate the location of features in laser data using 3D machine vision.
Figure 10:
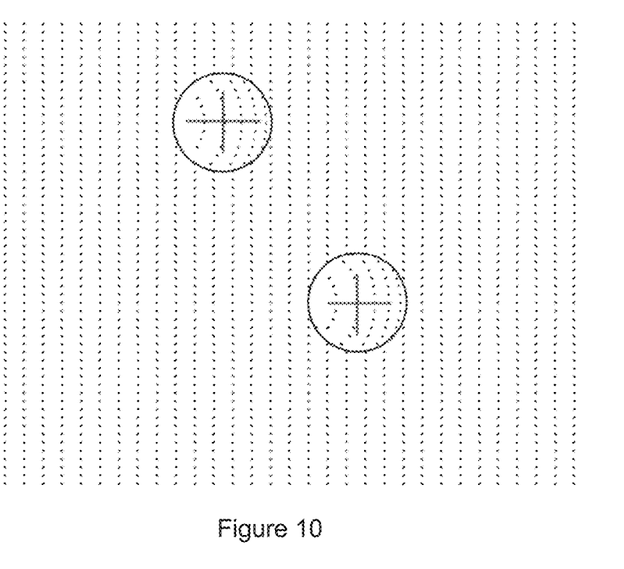

FIGS. 9 and 10 illustrate the location of features in the laser data using 3D machine vision.

Figure 11:
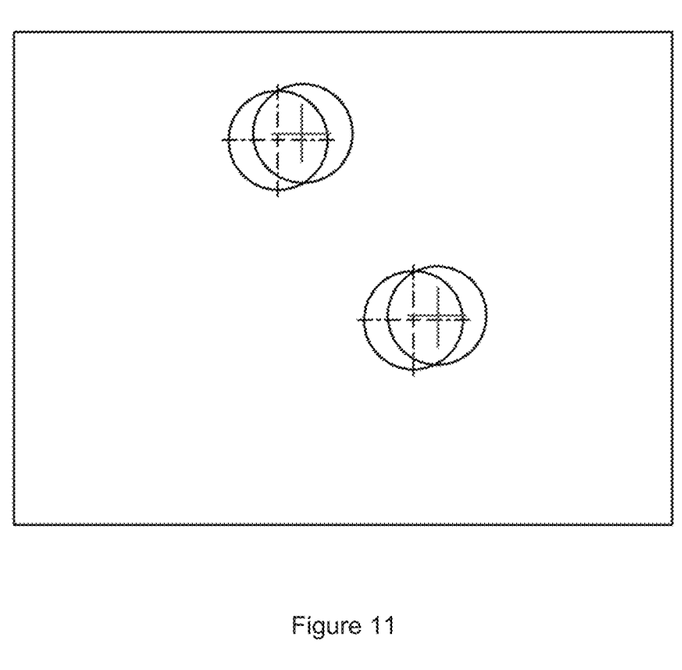
FIG. 11 illustrates a comparison in position between corresponding features in two image data sets.

FIG. 11 illustrates a comparison in position between corresponding features in two image data sets which can be used to iterate the solving of the laser plane equation as described before.

The choice as to which of the above-described methods is used may largely depend on the type of feature and scene. While the 2D image version may be quicker, the full 3D version may prove more robust across varying scenes. A hybrid approach may prove useful where a faster method such as the 2D approach is used to refine the model. What either method allows one to do is to reprocess previously acquired data. Analysis of these data sets and comparison between their performance may show up weaknesses and strengths of either method.

Two or More Camera Systems

In many circumstances it may be desirable to use a separate imaging system for white light imaging and laser imaging. In some other systems, multiple cameras may be used to achieve larger fields of view. A common feature of these systems is that:

the multiple cameras are on a shared sequential imaging system so time bases are known across the cameras very accurately; and there is normally significant overlap between adjacent imaging systems.

The calibration task comprises finding out the following:
1. The relative positions of all cameras in the system
2. The laser plane to laser camera calibration parameters ('D', 'θ', 'β')

Figure 12:
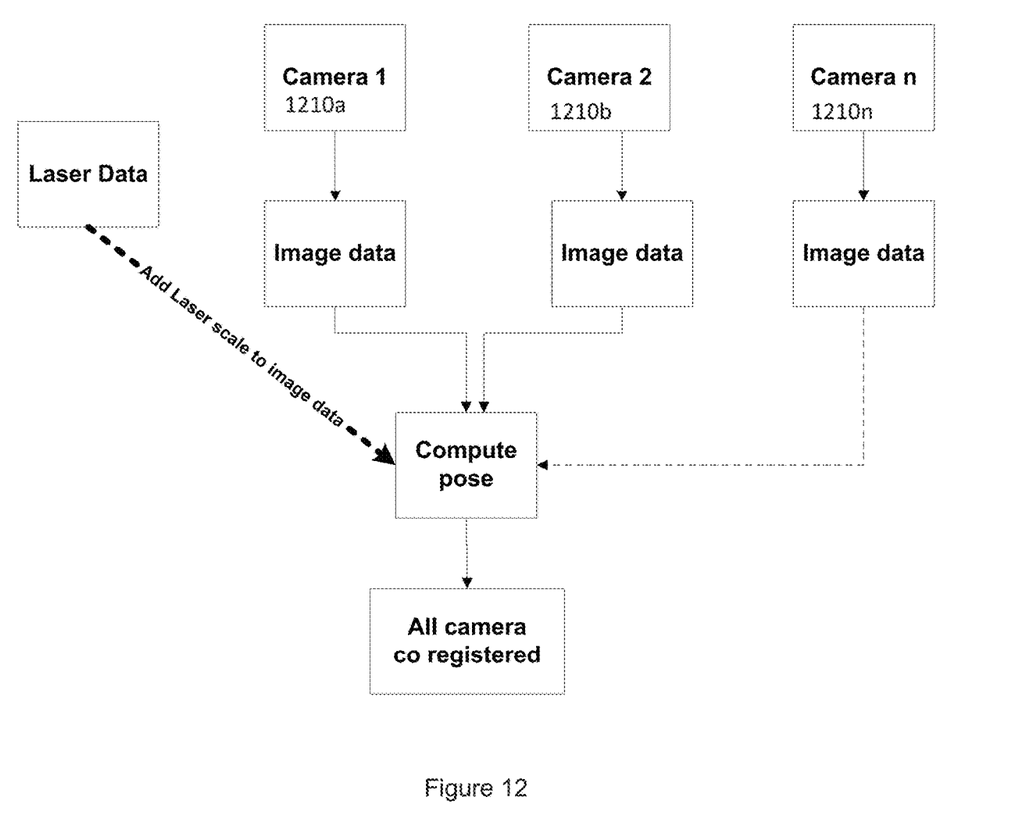
FIG. 12 illustrates a simple process for co-registering multiple cameras in a common coordinated space.

FIG. 12 illustrates a simple process for co-registering multiple cameras in a common coordinated space. Referring to FIG. 12, the system has n multiple cameras 1210a, 1210b to 1210n. The process comprises synchronising the acquisition of images from the multiple cameras, calculating the pose of each individual camera, and scaling the pose with laser data to a real world relative position of each camera. The process may be conducted over a sizable data set to refine the individual position of each camera. The result may appear as a first camera 1210a at the origin and each other camera at a position and orientation in space relative to the first camera 1210a.

The scale can also be quickly found by knowing the relative positions of the cameras. This can be physically measured accurately on many systems. Alternatively carrying out the step described in FIG. 12 in air and having a known measurement in the scene will enable a scaled in air photogrammetry which will reveal the physical translation between each camera. Such separation does not change in water. The separation applied to subsea data may automatically scale data extracted from images using photogrammetric techniques. When this data is analysed at a given refractive index, a complete transform matrices set can be extracted that describes the translation and rotation component between the multiple cameras. Tracking these transforms in subsequent data sets will show a change in refractive index as the rotational components will show change/error once the index changes and alters the system focal lengths in turn.

Tracking Calibration

Up to now, methods for tracking/measuring the laser plane to laser camera have been described. At the centre of all of this has been the assumption that the camera intrinsic calibration has been close to perfect. But as mentioned previously many factors can influence calibration. Of these, the most important influences that can be affected are:

1. Refractive index of water (from changes in salinity, water temperature, etc.)
2. Deformation due to pressure on camera housings.
3. Internal temperature of camera
4. Relative movement of cameras on their mounting due to environmental conditions.

Some control may be achieved over these elements. And these elements can be modelled. Movement on a subsea frame can be greatly minimised. Most design holds up well under hydrostatic loads. At higher pressure some bulk modulus deformation can occur. This effect may be tracked where a system works at different depths.

Internal temperature may often follow the mean water temperature, and thus its effect can be easily modelled and sized. The internal temperature of cameras used in the imaging systems described herein can be tracked, so its influence can be accounted for. Deformation which moves the plane of the camera port relative to the internal optics will affect the calibration numbers. Salinity may vary from sea region to region significantly and may have a significant effect on calibration. Knowing how the camera calibration reacts to salinity changes is important as it allows iteration of these parameters once a salinity change is expected.

To track calibration one needs a baseline that can be relied on. The most consistent fixed elements are the relative position between components such as cameras and lasers once they are bolted into place. Where a relative calibration of multiple cameras is performed in air or water, physical distances between the cameras can be recorded. These distances can be treated as fixed. Tracking these can therefore be achieved using the camera to camera calibration method to track their relative positions.

Where refractive index is the perceived culprit one (i.e. where the change has happened at a consistent depth and temperature) then the calibration parameters can be iterated to close in on the baseline position numbers. For single camera systems one can still track the laser to camera calibration to predict an environmental change that will affect calibration accuracy. Once this camera to laser position has been calibrated, barring physical alteration to the system it can be considered fixed and used as a means to track the camera calibration.

Measuring Environment

It can also be seen that the calibration process described herein may also provide information about the environment. A measure of refractive index is possible such that deviations of a type in the calibrations can be attributed to certain values for refractive index. Given that water temperature can easily be measured from sensors embedded in devices such as cameras and other subsea vehicle hardware and that there is good empirical data linking temperature, refractive index, depth and salinity, it may be possible to extract salinity information from the optical data.

Also of importance, is that the calibration techniques described herein can be used to measure local "anomalies" such as local heat changes. Specifically, if a local environment is considered as stable but where local environmental changes are due for example to a break in insulation of a subsea pipe, this results in local heating of water or air. Such changes can manifest as a change in "calibration." In effect, this allows the system to be used to measure heat leaks or to allow additional data to be collected where such potential "leaks" are identified.

For both laser data and image data, intensity and range to scene may be recorded using well controlled imaging and lighting hardware. Through travelling over a scene the range naturally varies and the intensity varies also, often requiring a change in imaging properties to maintain image quality. Quality of water in terms of turbidity has a very strong influence on light transmission.

This is often referred to as:

$$\frac{Io}{Ii} = e^{-\alpha L} (ref \text{ Beer-Lambert})$$

where Ii is the input light power, Io the reduced output light power, L the path length and α a measure of the absorption A development of this theory allows the change in intensity for one range to another to extract a number for the absorption factor α. Also when capturing laser and white light images, there is a noise component. Analysis of these noise components along with the absorption number allows direct turbidity measurement. This may be further aided by strobing certain fixed light frequencies to look at changing noise patterns. Even blue, green and red light have very different scattering and absorption behaviours. This may all be achieved in a sequential imaging sequence without affecting a main survey operation. Also knowledge of these factors may be used to influence a survey operation and system parameters. For example, an increase in absorption/turbidity may lower system sensitivity and influence a surveyor to perhaps choose a closer survey range and slower speed to maintain data quality. As surveys move into the future realm of unmanned and resident vehicles, such techniques supplemented by deep learning algorithms may form the basis of the artificial intelligence that vehicles will need to navigate a constantly changing environment In terms of the acquisition of images, the white light images may be obtained using at least one suitable image acquisition device. The raw image data may be acquired from one or more fixed or moving platforms with one or more image acquisition devices. In the context of the present disclosure, raw image data refers to unprocessed images. These may be RAW (uncompressed) or compressed formats such as JPEG, PNG and other standard formats for example. The image data may comprise one or more still images or a video sequence of one or more scenes. In the context of the present disclosure, still images are photographic images, typically digital. The resolution of the still images is typically higher than video, e.g. 8, 12.5, or 24 Megapixels (MP). Higher resolution is not necessary however. Optical design is key to the acquisition of high quality still or video images. Raw image data may have inputs from multiple cameras or sensing tools, in particular where they are linked in time or another aspect, e.g., from the same machine. The multiple images and measurements may be acquired at a common geographical location and/or at the same time.

The image data may then be processed using machine vision techniques. Machine vision can be used to analyse the captured images. Machine vision refers to the ability of a machine or computer to extract information from an image or a series of images and potentially to base machine decisions on the information extracted. Still image data or video data may be processed LIVE and in real time. Alternatively, image data may be stored in a database and processed offline using specific image processing and machine vision tools following storage.

Specific machine vision techniques include:
Event detection
Object recognition
Object measurement
Object classification
Image to image correlation for common points
Optical flow measurements
Navigation correction Machine vision techniques may be employed to extract data relating to a scene represented by the raw image data. That is, machine vision algorithms may be used to obtain: a description of the scene and an area within the scene, reference coordinates, position, area, size, objects, events, and colour data. Machine vision techniques may be employed for sequential imaging: capturing images under different light (e.g., white, UV, or Laser), thus adding additional information such as events found, and telemetry data such as range to object and size of object. A 3D point cloud data comprising a set of points may be extracted from a series of light profile images and mapped in space to provide a full 3D image of a scene. A 3D point cloud may be generated using photogrammetric techniques using a combination of still images and point cloud data.

As referred to above, machine vision functionality may be used to detect the scale of the image. Fixed light sources may be arranged to provide parallel illumination which serves as a reference to calibrate the field size being imaged. Preferably, this is done by using a structured light beam, for example, a pair of parallel laser lines. The lasers lines are a known, fixed distance apart. Therefore by comparing that known distance to the images of the laser lines captured as part of the sequential imaging, it is possible to deduce the scale of the image.

Machine vision functionality can also deduce the range of the objects in the scene from the camera. This can be carried out in a number of ways, described in relation to the use of structured light beams as part of the sequential imaging.

Machine vision may also be used to detect objects within the scene. For example, by performing edge detection on a white light image, it is possible to detect the edges of objects in the image. Edge detection is a fundamental tool in machine vision, particularly in the areas of feature detection and feature extraction. An edge detection algorithm may comprise a set of mathematical steps which aim to identify points in a digital image at which the image brightness changes sharply or, more formally, has discontinuities. The points at which image brightness changes sharply are typically organised into a set of curved line segments termed edges.

Object detection is another useful machine vision tool. Object detection may be used for detecting certain objects that are expected to be present in the image. Machine vision techniques can tag the images with the objects that are contained therein. Furthermore, when combined with location information as to where the image was captured, it is possible to uniquely identify the particular object identified. This may be useful for comparisons with previous or subsequent images.

An object within an image may be automatically detected, and assigned a probability that it corresponds to a known object contained in a library of objects. An image acquisition device itself may have intelligence to change some parameters of lighting or image acquisition to improve this probability. For a high resolution image of 12.5 Megapixels, the object in question may occupy only 1/20 of the pixels or less than 5% of the volume of data.

Machine vision may also be used to correlate adjacent still images into a larger combined still image. That is, machine vision techniques may comprise correlating data between multiple images to enable storage, retrieval, and visualisation of each of the images. The raw image data of the multiple images may comprise at least one common feature between at least some of the multiple images. Another form of machine vision processing involves mosaicking. A mosaic is a set of still images stitched together to provide a larger 2D view of a scene. Mosaicking uses machine vision algorithms and mapping/mosaic rules to align still images and build up mosaic layers for presentation on a geographic information system (GIS) application or visualisation tool. Another machine vision technique may involve combining aspects from each of a plurality of images in a sequential image capture to form an augmented output image of the scene.

In addition, through using machine vision techniques, time and position based data on specific objects can be used to perform comparisons and analytics on specific events and objects.

Event detection is another type of machine vision technique. In computing, an event is regarded as an action or occurrence recognised by software that may be handled by the software. Event detection comprises identifying an event within an image using geometric algorithms or other measurement techniques. The techniques by which event information may be tagged in the images as described above are known as machine vision, computer vision or image processing. Such events may be classified and characterised.

The present disclosure provides a method whereby deviations in positional parameters of an imaging system can be compensated for by using calibration parameters. Captured image data can be processed near real time to provide on the fly measurements or, after collection and storage at a later time. The image data may be processed to establish the calibration parameters that account for the above-mentioned deviations.

The present disclosure also provides an imaging system comprising: a broad light source; a structured light source; at least one imaging device configured to sequentially capture broad light source image data and structured light source image data of one or more scenes using the broad and structured light sources, respectively, and at least one processor configured to perform the image data processing methods described herein.

Figure 13:
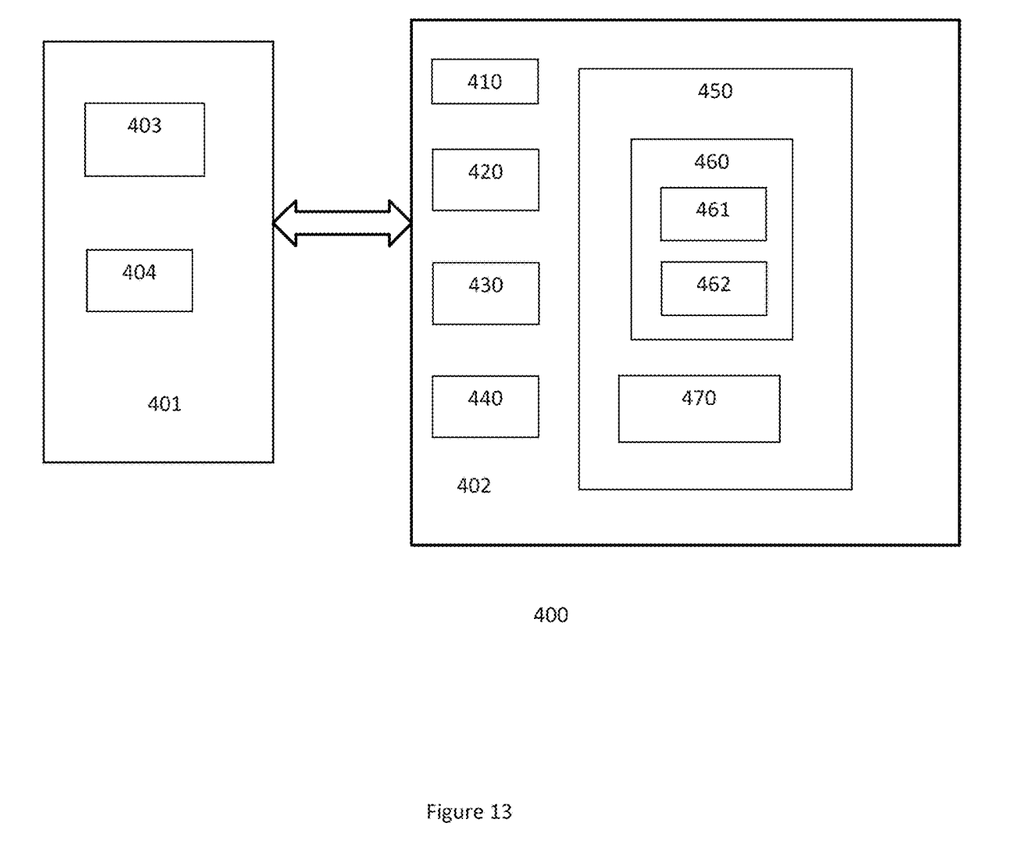
FIG. 13 is a block diagram illustrating a configuration of a system for calibrating parameters of an imaging system, according to an embodiment of the present disclosure.

FIG. 13 is a block diagram illustrating a configuration of a system 400 for calibrating parameters of an imaging system, according to an embodiment of the present disclosure. The system 400 includes various hardware and software components that function to perform the methods according to the present disclosure. Referring to FIG. 13, the system 400 comprises an imaging module 401 and a data processing module 402. The imaging module 401 comprises a light module 403 and an image acquisition module 404. The light module 403 may comprise a plurality of light classes, each light class having one or more different light sources as described above. The image acquisition module 404 comprises one or more image acquisition devices such as cameras. The raw image data may be captured from one or more fixed or moving platforms with the one or more image acquisition devices.

The data processing module 402 includes machine processing, machine vision functionality and data storage capability, as described above. The data processing module 402 is configured to perform the image data processing methods described herein. In use, images are captured by the imaging module 401 and processed by the data processing module 402. Referring to FIG. 13, the data processing module 402 comprises a user interface 410, a processor 420 in communication with a memory 450, and a communication interface 430. The processor 420 functions to execute software instructions that can be loaded and stored in the memory 450. The processor 420 may include a number of processors, a multi-processor core, or some other type of processor, depending on the particular implementation. The memory 450 may be accessible by the processor 420, thereby enabling the processor 420 to receive and execute instructions stored on the memory 450. The memory 450 may be, for example, a random access memory (RAM) or any other suitable volatile or non-volatile computer readable storage medium. In addition, the memory 450 may be fixed or removable and may contain one or more components or devices such as a hard drive, a flash memory, a rewritable optical disk, a rewritable magnetic tape, or some combination of the above.

One or more software modules 460 may be encoded in the memory 450. The software modules 460 may comprise one or more software programs or applications 461 and 462 having computer program code or a set of instructions configured to be executed by the processor 420. Such computer program code or instructions for carrying out operations for aspects of the systems and methods disclosed herein may be written in any combination of one or more programming languages.

Other information and/or data relevant to the operation of the present system and methods, such as a database 470, may also be stored in the memory 450. The database 470 may contain and/or maintain various data items and elements that are utilized throughout the various operations of the method and system described above.

The words comprises/comprising when used in this specification are to specify the presence of stated features, integers, steps or components but does not preclude the presence or addition of one or more other features, integers, steps, components or groups thereof.

The invention claimed is:

1. A method for calibrating parameters of an imaging system including at least one imaging device and broad and structured light sources, the method comprising:
sequentially capturing, via the or each imaging device, broad light source image data and structured light source image data of one or more scenes using the broad and structured light sources, respectively;
generating a photogrammetric model from the broad light source image data and a photogrammetric model from the structured light source image data using respective coordinates of points determined from the broad and structured light source image data including triangulating an image vector of the imaging device and a plane of the structured light source to determine the coordinates of the points within the structured light source image data, said triangulating based on determining the relative positions of the imaging device and structured light source when the broad and structured light source image data is captured, the relative positions including relative angles and an offset ('D', 'θ, 'β') of the structured light source to the imaging device, wherein:
'D' is a distance from the optical axis of the imaging device to the structured light source plane;
'θ' is an angle of the structured light source plane to the imaging device flat port plane; and
'β' is a twist in the structured light source plane;
determining corresponding features in the respective photogrammetric models;
iteratively solving parameters of the imaging system to correct variations between corresponding features in the respective photogrammetric models, converge the models and obtain calibration parameters; and
applying the calibration parameters to the imaging system to compensate for errors in the relative positions of the imaging device and structured light source.

2. The method of claim 1, wherein the broad light source comprises a white light source.

3. The method of claim 1, wherein the structured light source comprises a laser source.

4. A method for calibrating parameters of an imaging system including at least one imaging device and broad and structured light sources, the method comprising:
sequentially capturing via the or each imaging device, broad light source image data and structured light source image data of one or more scenes using the broad and structured light sources, respectively;

generating a photogrammetric model from the broad light source image data and a photogrammetric model from the structured light source image data using respective coordinates of points determined from the broad and structured light source image data including:
  determining a camera pose from the broad light source image data; and
  applying a scale to the camera pose using the structured light source image data to obtain a position of the imaging device relative to the one or more scenes;
determining corresponding features in the respective photogrammetric models;
iteratively solving parameters of the imaging system to correct variations between corresponding features in the respective photogrammetric models, converge the models and obtain calibration parameters; and
applying the calibration parameters to the imaging system to compensate for errors in the relative positions of the imaging device and structured light source.

5. The method of claim 4, comprising using the camera pose obtained from the broad light source image data to determine the coordinates of the points within the structured light source image data.

6. The method of claim 1, wherein the generating a photogrammetric model from the broad light source image data comprises 2D machine processing of the broad light source image data.

7. The method of claim 1, wherein the generating a photogrammetric model from the broad light source image data comprises 3D machine processing of the broad light source image data.

8. The method of claim 1, comprising determining the location of features in the structured light source image data using 3D machine vision.

9. The method of claim 1, comprising extracting 3D point cloud data comprising a set of points from the structured light source image data to provide a full 3D model.

10. The method of claim 6, wherein the machine processing comprises performing at least one of event detection, object recognition, object measurement and object classification on the image data.

11. A method for calibrating parameters of an imaging system including a plurality of imaging devices and broad and structured light sources, the method comprising:
  sequentially capturing via each imaging device, broad light source image data and structured light source image data of one or more scenes using the broad and structured light sources, respectively;
  generating a photogrammetric model from the broad light source image data and a photogrammetric model from the structured light source image data using respective coordinates of points determined from the broad and structured light source image data;
  determining corresponding features in the respective photogrammetric models;
  iteratively solving parameters of the imaging system to correct variations between corresponding features in the respective photogrammetric models, converge the models and obtain calibration parameters; and
  applying the calibration parameters to the imaging system to compensate for errors in the relative positions of each imaging device and structured light source;
  synchronising the acquisition of images by the plurality of imaging devices;
  determining a pose of each individual imaging device; and
  scaling the pose with the structured light source image data to obtain real-world relative positions of all the imaging devices in the system.

12. The method of claim 11, comprising scaling the pose based on fixed known separation between the imaging devices which is measured in air.

13. A system for calibrating parameters of an imaging system, comprising:
  a broad light source;
  a structured light source;
  each of at least one imaging device configured to sequentially capture broad light source image data and structured light source image data of one or more scenes using the broad and structured light sources, respectively; and
  at least one processor configured to:
    generate a photogrammetric model from the broad light source image data and a photogrammetric model from the structured light source image data using respective coordinates of points determined from the broad and structured light source image data including triangulating an image vector of the imaging device and a plane of the structured light source to determine the coordinates of the points within the structured light source image data, said triangulating based on determining the relative positions of the imaging device and structured light source when the broad and structured light source image data is captured, the relative positions including relative angles and an offset ('D', 'θ', 'β') of the structured light source to the imaging device, wherein:
      'D' is a distance from the optical axis of the imaging device to the structured light source plane;
      'θ' is an angle of the structured light source plane to the imaging device flat port plane; and
      'β' is a twist in the structured light source plane;
    determine corresponding features in the respective photogrammetric models;
    iteratively solve parameters of the imaging system to correct variations between corresponding features in the respective photogrammetric models, converge the models and obtain calibration parameters; and
    apply the calibration parameters to the imaging system to compensate for errors in the relative positions of the imaging device and structured light source.

14. The system of claim 13, comprising a plurality of imaging devices.

* * * * *